(12) United States Patent
Yoon et al.

(10) Patent No.: US 12,476,625 B2
(45) Date of Patent: Nov. 18, 2025

(54) CLOCK SIGNAL SYNCHRONIZATION CIRCUIT, SEMICONDUCTOR MEMORY DEVICE INCLUDING CLOCK SIGNAL SYNCHRONIZATION CIRCUIT, AND METHOD OF OPERATING CLOCK SIGNAL SYNCHRONIZATION CIRCUIT

(71) Applicant: Samsung Electronics Co., Ltd., Suwon-si (KR)

(72) Inventors: Junsub Yoon, Suwon-si (KR); Jang-Woo Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 18/239,450

(22) Filed: Aug. 29, 2023

(65) Prior Publication Data
US 2024/0313750 A1   Sep. 19, 2024

(30) Foreign Application Priority Data

Mar. 16, 2023   (KR) ........................ 10-2023-0034776

(51) Int. Cl.
*H03K 5/08*   (2006.01)
*H03K 5/131*   (2014.01)
*H03K 5/133*   (2014.01)

(52) U.S. Cl.
CPC ............ *H03K 5/088* (2013.01); *H03K 5/131* (2013.01); *H03K 5/133* (2013.01)

(58) Field of Classification Search
None
See application file for complete search history.

(56) References Cited

U.S. PATENT DOCUMENTS

| | | | |
|---|---|---|---|
| 6,038,254 A | 3/2000 | Ferraiolo et al. | |
| 6,657,456 B1 | 12/2003 | Jefferson et al. | |
| 7,492,200 B2 | 2/2009 | Na | |
| 10,056,909 B1* | 8/2018 | Qi | H03L 7/0818 |
| 11,942,954 B2* | 3/2024 | Fang | G11C 11/4076 |
| 2008/0042704 A1 | 2/2008 | Na | |
| 2010/0123498 A1 | 5/2010 | Bae et al. | |

FOREIGN PATENT DOCUMENTS

| | | |
|---|---|---|
| KR | 20010064123 A | 7/2001 |
| KR | 20080001435 A | 1/2008 |
| KR | 20100056156 A | 5/2010 |
| KR | 20170057029 A | 5/2017 |

* cited by examiner

*Primary Examiner* — Cassandra F Cox
(74) *Attorney, Agent, or Firm* — Wolf, Greenfield & Sacks, P.C.

(57) ABSTRACT

A clock signal synchronization circuit includes a delay line configured to delay an input clock signal in response to a delay control signal to output an output clock signal, a replica circuit configured to delay the output clock signal to output a feedback clock signal, a phase detector configured to compare the input clock signal and the feedback clock signal with each other to detect a phase difference, and a delay control circuit configured to generate the delay control signal based on the phase difference. The replica circuit may delay the output clock signal based on an operation mode of a memory device to output the feedback clock signal.

20 Claims, 12 Drawing Sheets

[FIG. 1]
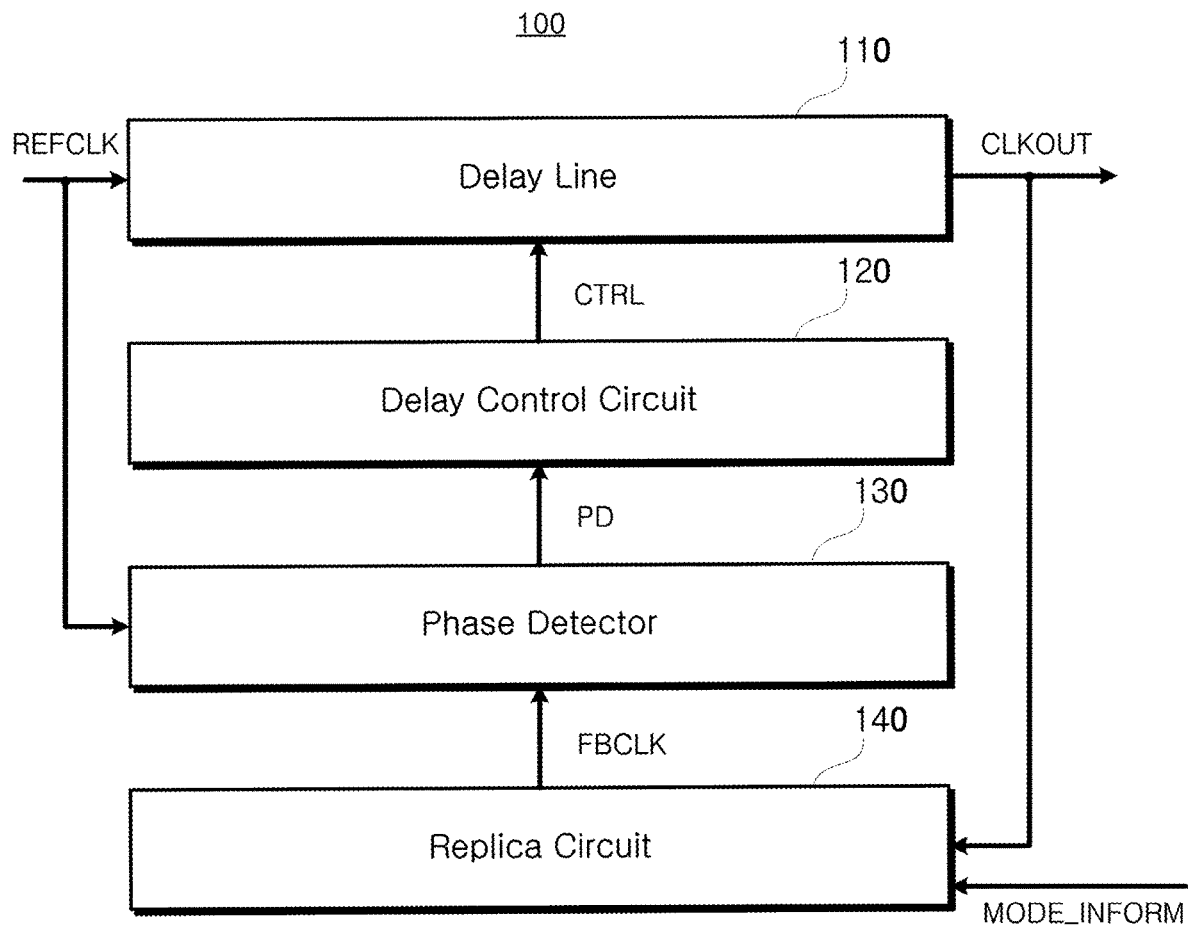

[FIG. 2]
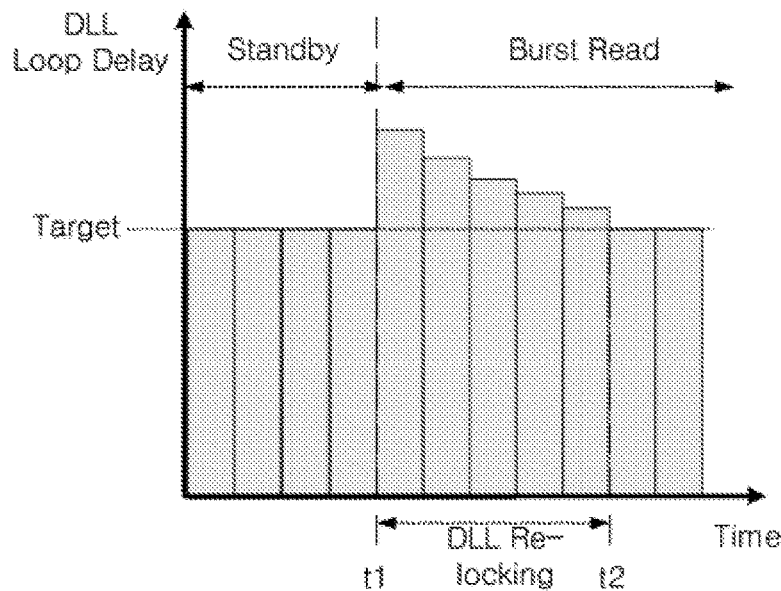
[FIG. 3]
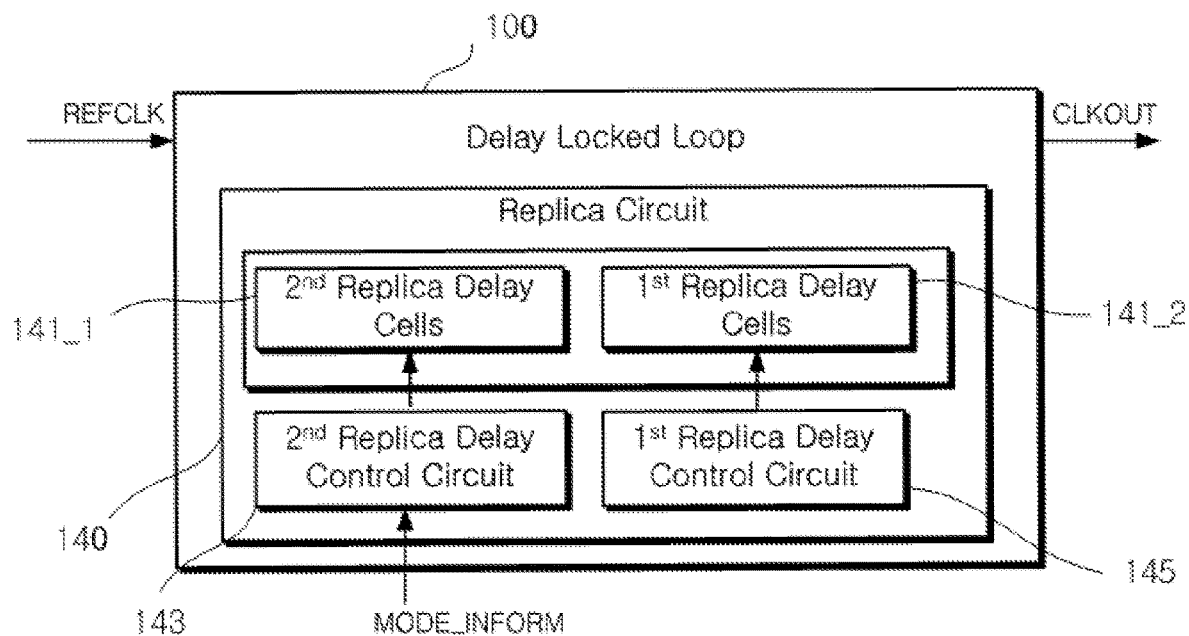

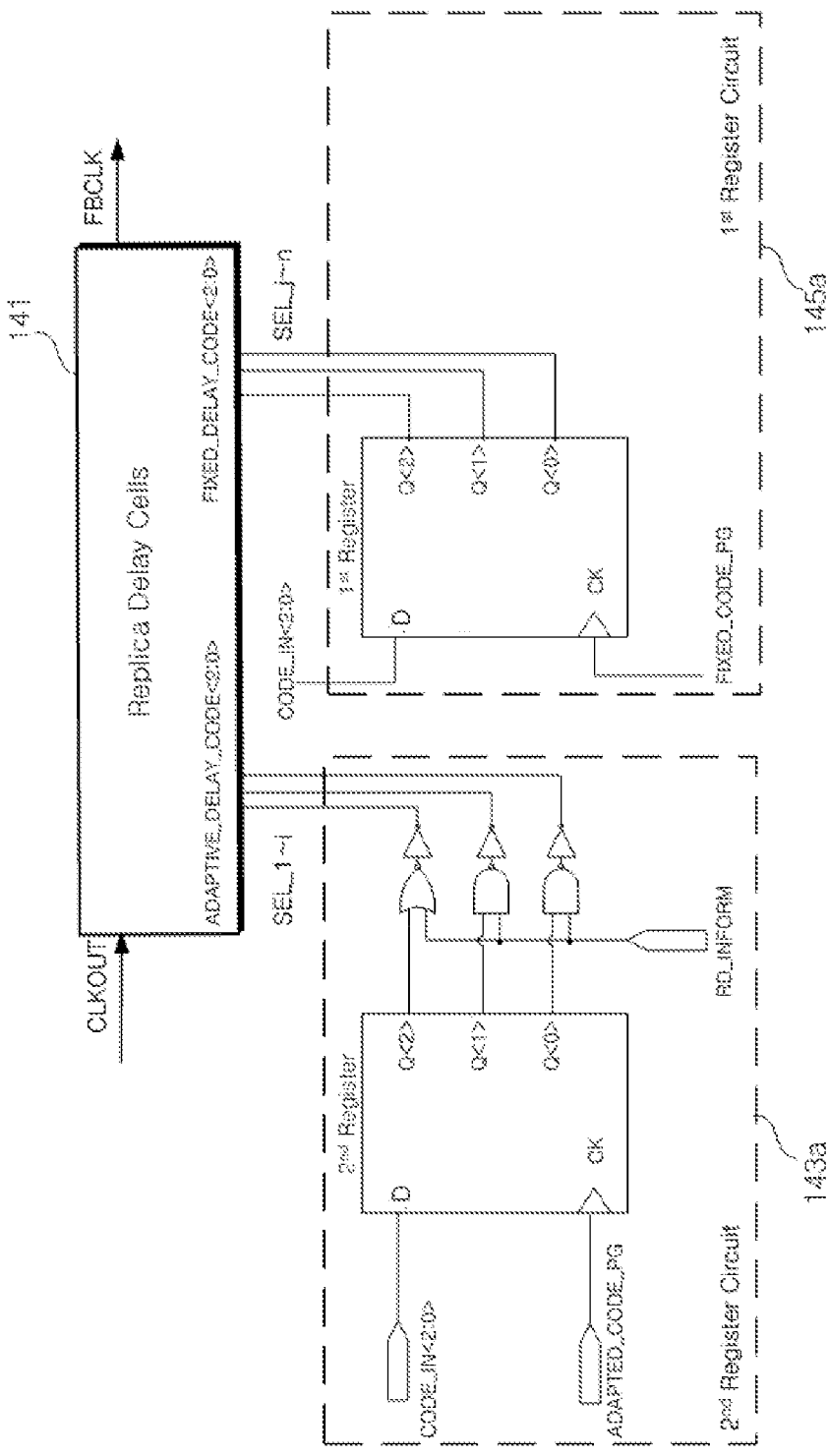
[FIG. 4]

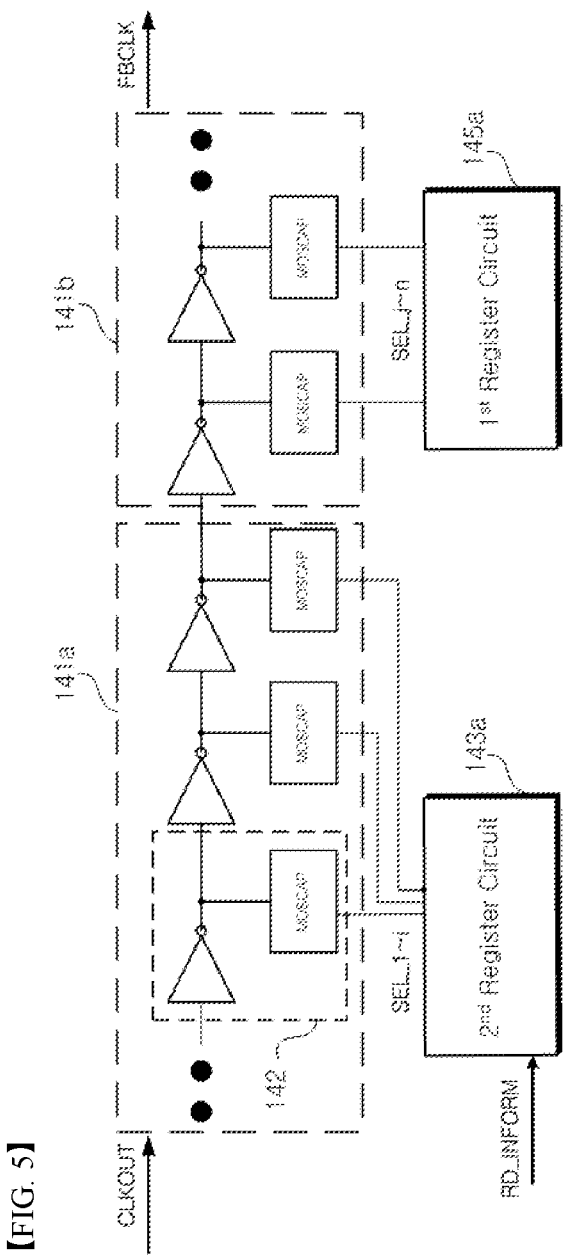
[FIG. 5]

[FIG. 6]
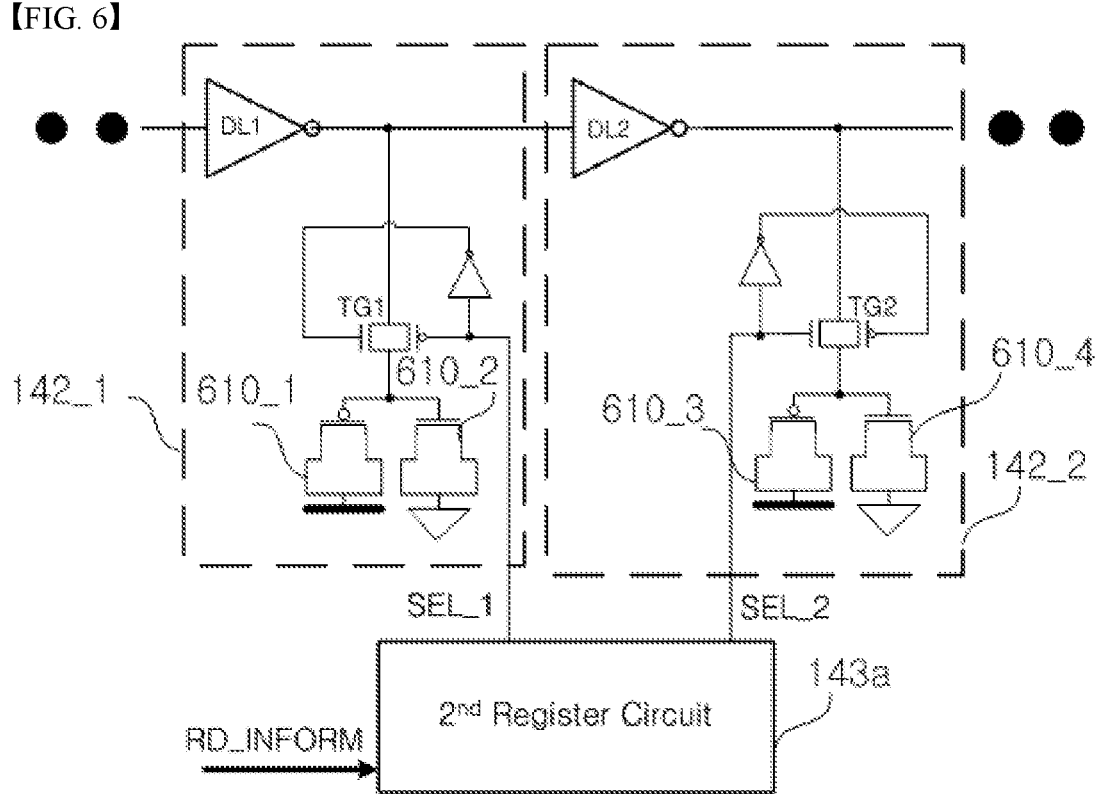

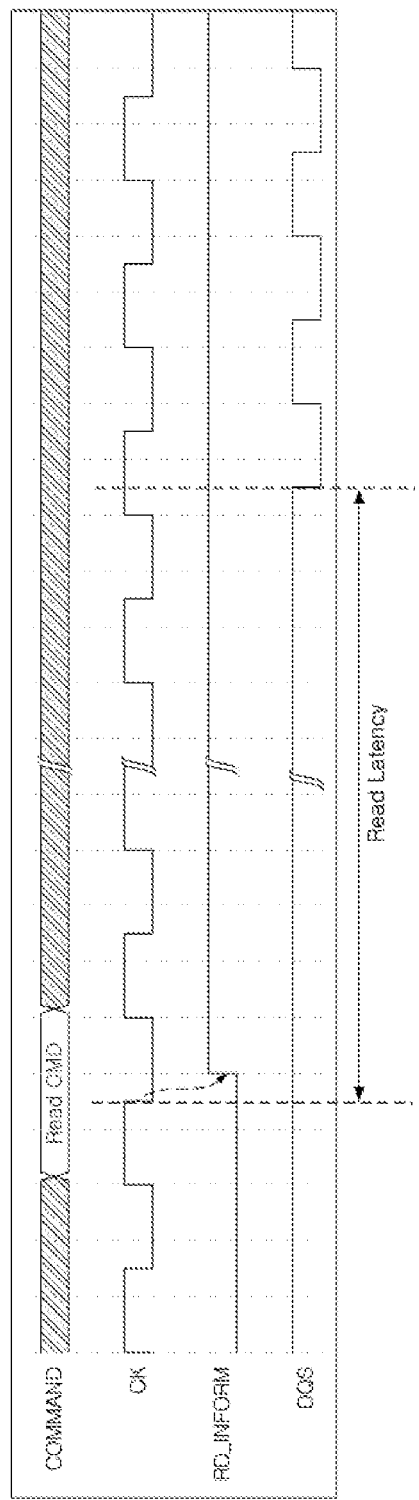
[FIG. 7]

[FIG. 8]
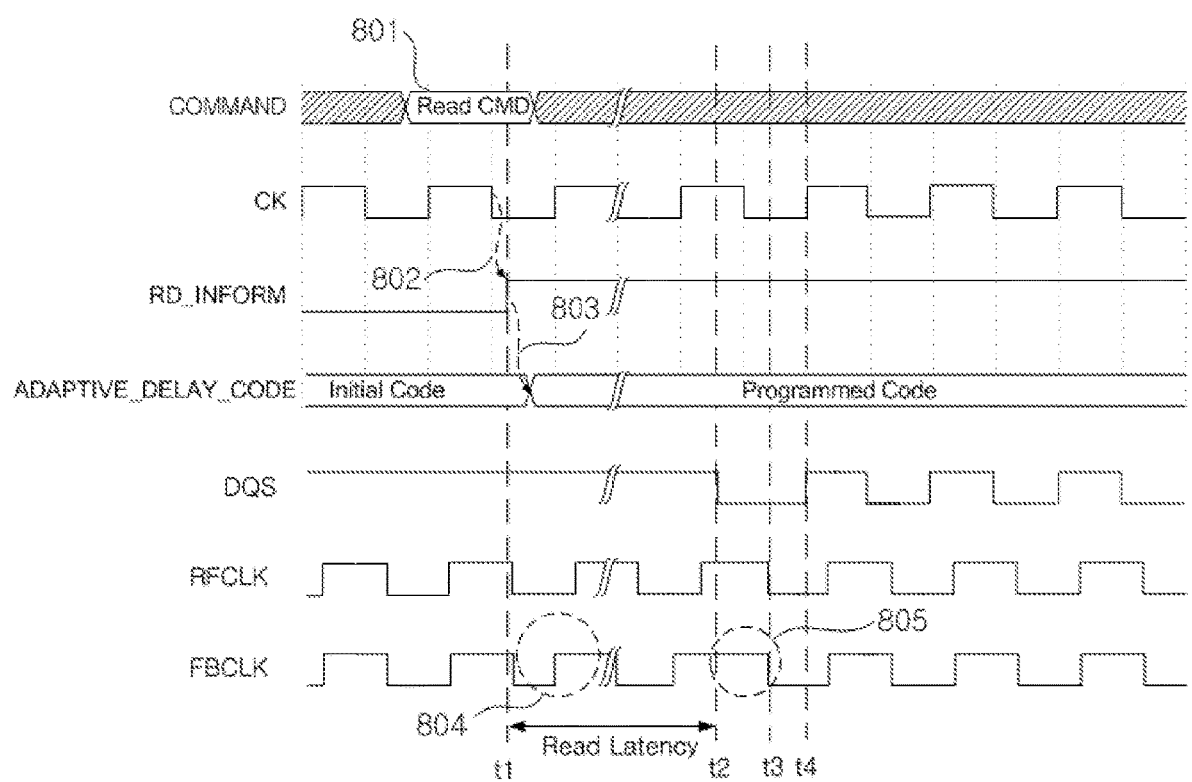

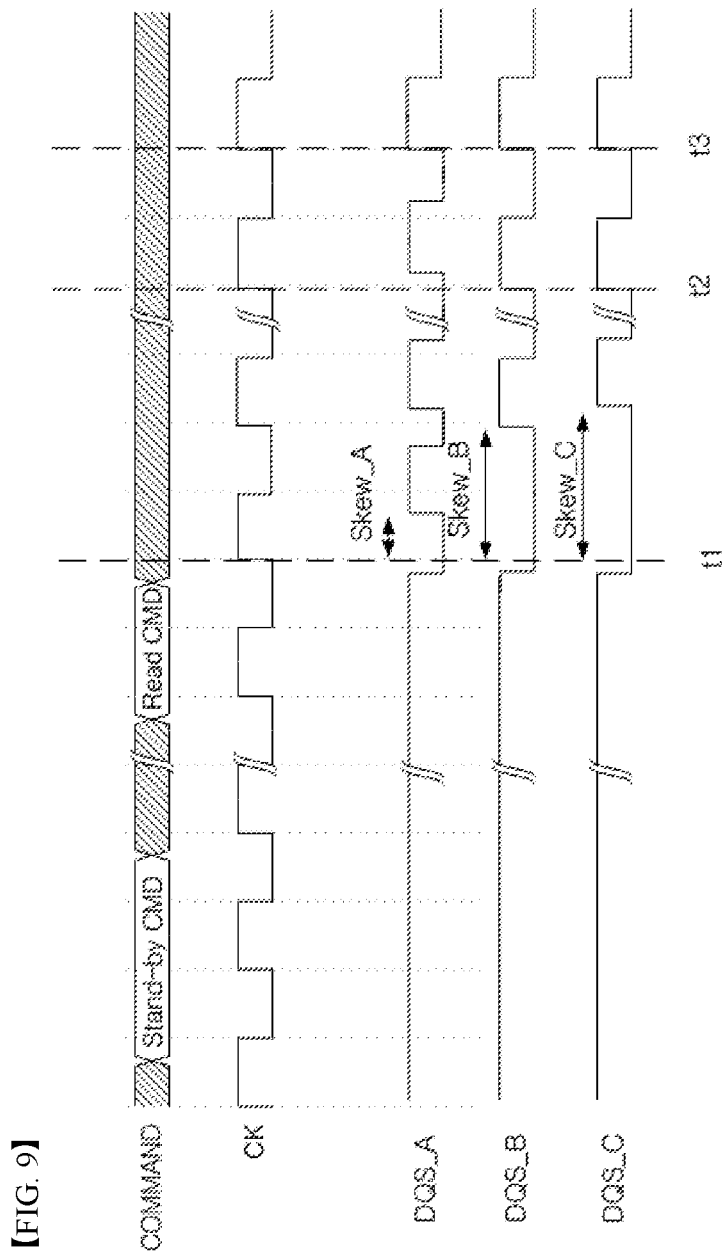

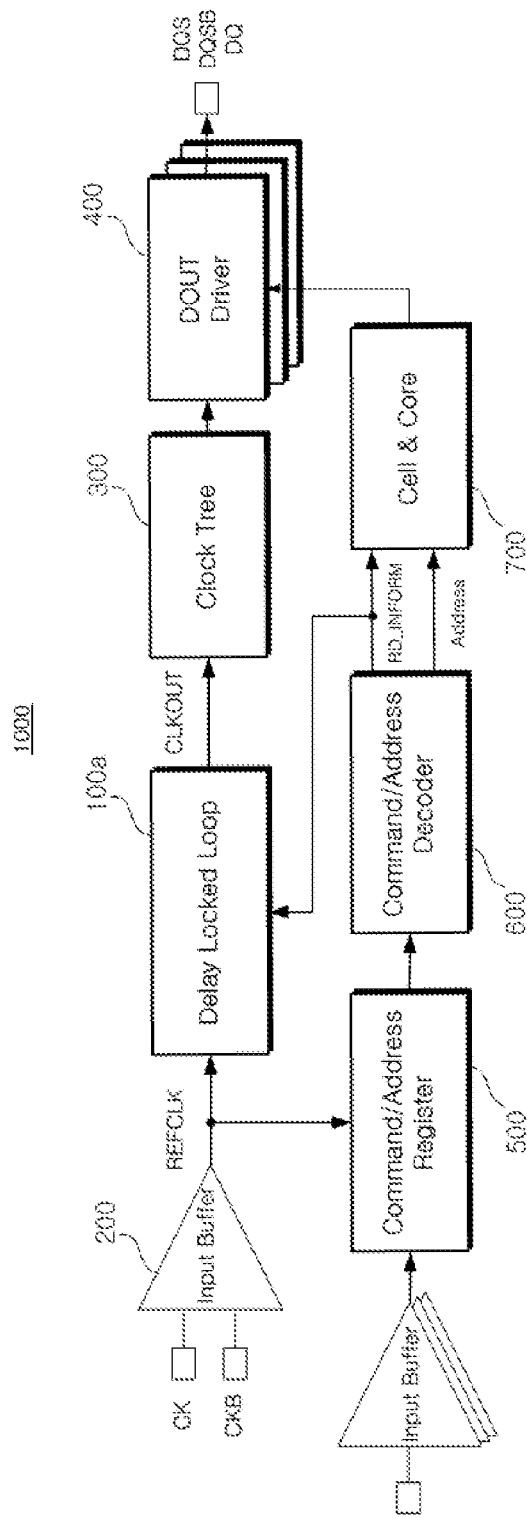
[FIG. 10]

[FIG. 11]
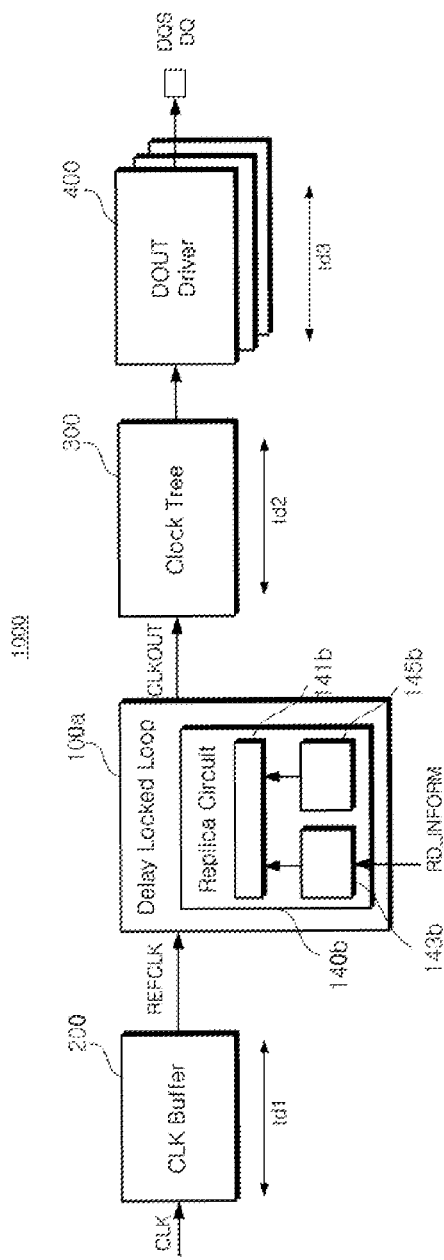

[FIG. 12]
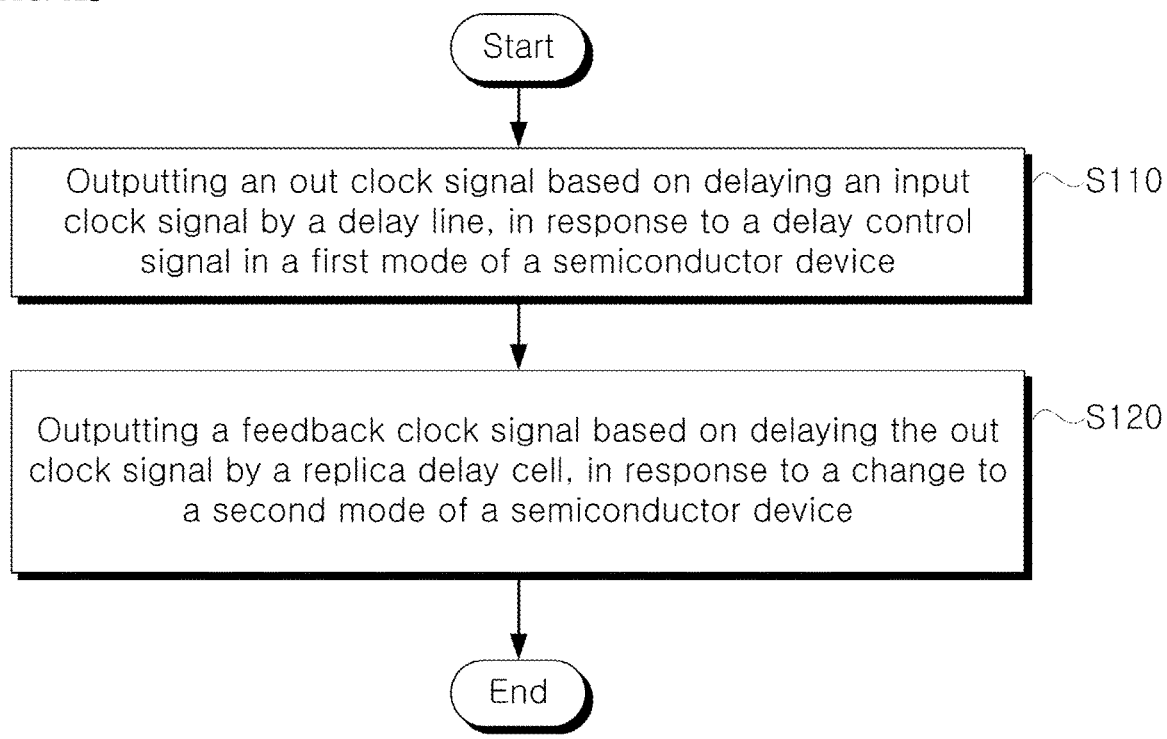

[FIG. 13]
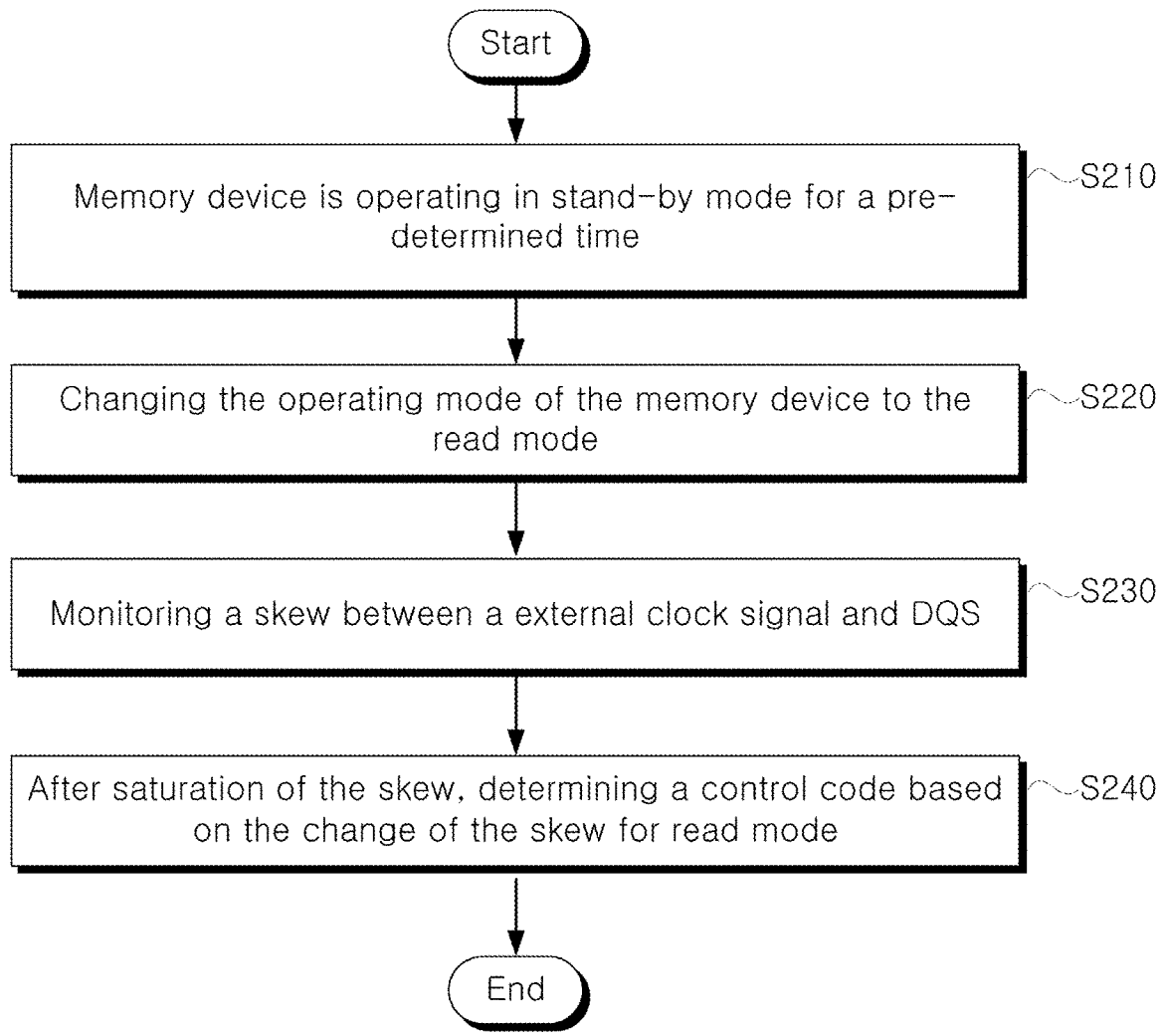

CLOCK SIGNAL SYNCHRONIZATION CIRCUIT, SEMICONDUCTOR MEMORY DEVICE INCLUDING CLOCK SIGNAL SYNCHRONIZATION CIRCUIT, AND METHOD OF OPERATING CLOCK SIGNAL SYNCHRONIZATION CIRCUIT

CROSS-REFERENCE TO RELATED APPLICATION(S)

This application claims benefit of priority to Korean Patent Application No. 10-2023-0034776, filed on Mar. 16, 2023, in the Korean Intellectual Property Office, the disclosure of which is incorporated herein by reference in its entirety.

BACKGROUND

The present disclosure relates to a clock signal synchronization circuit of a memory device.

A delayed locked loop (DLL), used as a circuit for synchronizing an input clock signal and an output clock signal in a high-speed circuit such as a memory device or the like, changes a phase of an input clock signal using a delay line to generate an output clock signal, and thus is used to secure an accurate operation timing of the memory device or the like.

A delay locking loop compares a clock signal, generated by feeding back an output clock signal, with an input clock signal, and thus delays the input clock signal by a difference therebetween to lock a phase difference between the two signals in a state in which the phase difference is narrowed.

SUMMARY

Example embodiments provide a clock signal synchronization circuit compensating for a delay of a clock signal rapidly and accurately when an environment of power is changed.

According to example embodiments, a clock signal synchronization circuit includes a delay line configured to delay an input clock signal in response to a delay control signal to output an output clock signal, a replica circuit configured to delay the output clock signal to output a feedback clock signal, a phase detector configured to compare the input clock signal and the feedback clock signal with each other to detect a phase difference, and a delay control circuit configured to generate the delay control signal based on the phase difference. The replica circuit is configured to delay the output clock signal based on an operation mode of a memory device to output the feedback clock signal.

According to example embodiments, a semiconductor memory device including a plurality of memory cells and includes an input buffer configured to receive an external clock signal and configured to output a reference clock signal, and a clock signal synchronization circuit configured to delay the reference clock signal based on a delay control signal to generate an output clock signal that is synchronized with the reference clock signal. The clock signal synchronization circuit may include a replica circuit configured to delay the output clock signal and configured to output a feedback clock signal, and a delay control circuit configured to generate the delay control signal based on a phase difference between the reference clock signal and the feedback clock signal. The replica circuit is configured to delay the output clock signal based on an operation mode of the semiconductor memory device to output the feedback clock signal.

According to example embodiments, a method of operating a clock signal synchronization circuit, including a delay line and a replica circuit, includes outputting an output clock signal based on the delay line delaying an input clock signal in response to a delay control signal in a first operation mode of a memory device and outputting a feedback clock signal based on the replica circuit delaying the output clock signal to output the feedback clock signal used for generation of the delay control signal. A delay of the output clock signal is responsive to a change to a second operation mode of the memory device.

BRIEF DESCRIPTION OF DRAWINGS

The above and other aspects, features, and advantages of the present disclosure will be more clearly understood from the following detailed description, taken in conjunction with the accompanying drawings.

FIG. 1 is a block diagram of a clock signal synchronization circuit according to example embodiments.

FIG. 2 is a diagram illustrating a result of an experiment performed on a delay change of a data strobe signal DQS when a power environment of a delay locked loop according to the related art is changed.

FIG. 3 is a block diagram of a replica circuit of a clock signal synchronization circuit according to example embodiments.

FIG. 4 is a block diagram illustrating an example of a replica circuit of a clock signal synchronization circuit according to example embodiments.

FIG. 5 is a circuit diagram illustrating an example of a delay cell of the replica circuit of FIG. 4.

FIG. 6 is a circuit diagram illustrating, in more detail, a delay cell of the replica circuit of FIG. 5.

FIG. 7 is a timing diagram illustrating an example of an operation of a clock signal synchronization circuit according to example embodiments.

FIG. 8 is a timing diagram illustrating, in detail, an operation of a clock signal synchronization circuit according to example embodiments.

FIG. 9 is a timing diagram illustrating an example of an operation of setting a control signal based on a change in an operation mode of a memory device according to example embodiments.

FIG. 10 is a block diagram of a semiconductor memory device employing a clock signal synchronization circuit according to example embodiments.

FIG. 11 is a block diagram illustrating a portion of a semiconductor memory device according to example embodiments.

FIG. 12 is a flowchart illustrating a method of operating a clock signal synchronization circuit according to example embodiments.

FIG. 13 is a flowchart illustrating an operation method of setting a control signal based on a change in operation mode according to example embodiments.

DETAILED DESCRIPTION

Hereinafter, example embodiments will be described with reference to the accompanying drawings.

FIG. 1 is a block diagram of a clock signal synchronization circuit 100 according to example embodiments. The clock signal synchronization circuit 100 may be implemented as a delay locked loop (DLL). The clock signal synchronization circuit 100 according to example embodiments may be used to synchronize a data strobe signal DQS of a semiconductor memory device with an external clock signal, provided by a memory controller, when the clock signal synchronization circuit 100 is implemented in the semiconductor memory device. To this end, the clock signal synchronization circuit 100 may synchronize an output clock signal CLKOUT of the clock signal synchronization circuit 100, used to generate a data strobe signal DQS, and an input clock signal REFCLK that is input to the clock signal synchronization circuit 100, with each other.

Accordingly, the clock signal synchronization circuit 100 of the semiconductor memory device may transmit data in synchronization with a clock signal of a memory controller such that the data arrives at the memory controller within an expected time. The clock signal synchronization circuit 100 may be implemented in a semiconductor memory device. As another example, the clock signal synchronization circuit 100 may be implemented in a memory module, outside of a memory chip.

Referring to FIG. 1, the clock signal synchronization circuit 100 may include a delay line 110, a delay control circuit 120, a phase detector 130, and a replica circuit 140. The clock signal synchronization circuit 100 may have a feedback loop structure.

The clock signal synchronization circuit 100 may be used in various circuits such as a semiconductor memory device, an integrated circuit, a communication circuit, or the like, in applications using a high-frequency clock signal. In the present specification, the clock signal synchronization circuit 100 has been described as being used in a semiconductor memory device as example embodiments, but example embodiments are not limited thereto.

The delay line 110 may delay the received input clock signal REFCLK to output an output clock signal CLKOUT, and may include a plurality of delay elements. The delay elements of the delay line 110 may delay the input clock signal REFCLK by chaining a plurality of known delay elements, such as an inverter and/or a complementary metal-oxide-semiconductor (CMOS) logic gate, and allowing at least some of the delay elements to control an amount of delay in response to a delay control signal CTRL provided from the delay control circuit 120. As used herein, the term "delay" may be a degree of delay, an amount of delay, a time of delay, a time amount of delay. These terms will be used interchangeably. When the delay element includes a CMOS logic gate, the logic gate may be a NAND gate. The delay line 110 may include a plurality of delay cells that delay the input clock signal REFCLK by a predetermined time, and each of the plurality of delay cells may include a plurality of delay elements.

The delay line may be a variable delay line VDL which may control an amount of delay of the input clock signal REFCLK by controlling passing of the input clock signal REFCLK through at least some of the plurality of delay cells in response the delay control signal CTRL provided from the delay control circuit 120, designating a location to which the input clock signal REFCLK is input in the plurality of delay cells, or controlling capacity of a capacitor connected to one or more inverters of a delay cell. The control signal CTRL may be a voltage, or a control code including a plurality of bits of a register.

The delay cell, which may include a unit delay element of the delay line 110, may be a known structure in which a shunt capacitor and an inverter are coupled to each other, a current-starved delay element, and/or the like, but the type of the delay cell is not limited to these example embodiments.

The delay control circuit 120 may provide a delay control signal CTRL to the delay line 110 based on a phase difference signal PD detected by the phase detector 130. In example embodiments, the delay control circuit 120 may be a charge pump when the delay line 110 is controlled in an analog manner, or may be a register when the delay line 110 is controlled in a digital manner. When the delay control circuit 120 is implemented as an analog circuit, the clock signal synchronization circuit 100 may selectively include a low-pass filter (a loop filter) that removes high-frequency components from an output of the phase detector 130. The delay control circuit 120 may output the delay control signal CTRL to increase the delay of the delay line 110 in proportion to the phase difference according to the phase difference signal PD.

The phase detector 130 may compare a phase of the input clock signal REFCLK with a phase of a feedback clock signal FBCLK to output a phase difference signal PD proportional to a difference therebetween. The phase detector 130 may perform a comparison operation until a rising edge of the input clock signal REFCLK and a rising edge of the feedback clock signal FBCLK that is output from the replica circuit 140 are synchronized with each other to remove the phase difference, and may output the difference.

The phase detector 130 is an edge trigger type flip-flop circuit, or an arbiter circuit including a latch, including two cross-coupled NAND gates to which an input clock signal REFCLK and a feedback clock signal FBCLK are respectively input, and may include a comparator that compares outputs of the latch to output a pulse having a width proportional to a phase difference.

The replica circuit 140 may model delays of elements on a signal path through which the output clock signal CLKOUT output from the delay line 110 is transmitted, and may reflect the modeled delays in the feedback clock signal FBCLK. The clock signal synchronization circuit 100 may synchronize an input clock signal REFCLK that passes through an input buffer or the like, and the output clock signal CLKOUT with each other to synchronize an external clock signal that is used to generate a data strobe signal DQS and the input clock signal REFCLK with each other. Accordingly, an additional delay may occur in the output clock signal CLKOUT output from the clock signal synchronization circuit 100 while the output clock signal CLKOUT passes through subsequent elements. The replica circuit 140 may model a delay of a modeled clock signal CLKOUT of an input buffer that provides the input clock signal REFCLK, and/or may model a delay of an external device based on the output clock signal CLKOUT to compensate for the additional delay. Then, the replica circuit 140 may delay the output clock signal CLKOUT by an amount of the modeled delay to generate a feedback clock signal FBCLK. For example, the replica circuit 140 may model signal delays of an output buffer, a clock tree, and a data output driver of a semiconductor memory device. Also, the replica circuit 140 may model a delay of an input buffer receiving an external clock signal to provide the input clock signal REFCLK. The input clock signal REFCLK may be referred to as an internal clock signal used inside the clock signal synchronization circuit 100.

The replica circuit 140 may include a plurality of delay cells that delay the output clock signal CLKOUT by the amount of the modeled delay.

The replica circuit 140 according to example embodiments may vary an amount of delay of the output clock signal CLKOUT to output the feedback clock signal FBCLK, and may change the amount of delay based on an operation mode of a device used by the clock signal synchronization circuit 100. For example, when the device is a semiconductor memory device and an operation mode of the semiconductor memory device is changed, a clock skew of elements may be increased due to a change in the power environment, such as a voltage drop, provided to elements, thereby causing a signal delay. For example, a delay locked loop may use a large number of delay elements, so that an amount of delay of each element may be significantly changed when the power environment, or the like, is changed.

Referring to FIG. 2, a description will be provided for a result of an experiment performed on a change in delay of a data strobe signal DQS when an operation mode of a semiconductor memory device employing a common delay locked loop is changed. It may be identified that when the memory device starts to perform a burst read operation, a timing of a delayed data strobe signal DQS gradually becomes faster and is fixed after a predetermined time has elapsed. For example, it may be determined that a clock skew of elements is temporarily increased due to a change in power environment caused by a change to a burst read operation mode, and the data strobe signal DQS fixed to a specific clock signal is delayed in a standby mode prior to the burst read operation mode, so that the delay locked loop according to the related art reflects the increased clock skew to perform re-locking of the data strobe signal DQS (substantially re-locking of a feedback clock). For example, during a burst read operation that starts at time t1, the DLL re-locking may occur until time t2.

Therefore, when the replica circuit 140 according to example embodiments receives an operation mode change signal MODE_INFORM that changes an operation mode to a specific operation mode of the semiconductor device including the clock signal synchronization circuit 100, the replica circuit 140 may reflect a clock skew of corresponding elements caused by a change in the specific operation mode and may differently delay an output clock signal CLKOUT by a predetermined amount of delay to output a feedback clock signal FBCLK.

The replica circuit 140 according to example embodiments may reflect an increase in the clock skew of elements caused by a change in the specific operation mode of the device to prevent a locked state of a clock signal synchronization circuit from being released due to the increase in the clock skew and to prevent re-locking from being performed, thereby securing a stable and fast operation of a high-speed circuit such as a memory device.

In addition, the clock skew of the elements caused by the change in the specific operation mode may be reflected in a replica delay cell of the replica circuit 140 and a replica control circuit to reduce complexity of a configuration of changing the delay control circuit 120 and the phase detector 130 and to easily respond to a change in design of a memory device, or the like.

FIG. 3 is a block diagram of a replica circuit 140 of a clock signal synchronization circuit according to example embodiments. Although FIG. 3 illustrates example embodiments in which the replica delay control circuit includes a plurality of circuits 143 and 145, a configuration in which the replica delay control circuit includes a single circuit is not precluded.

The replica circuit 140 according to example embodiments may include a plurality of delay cells 141_1 and 141_2, that receive an output clock signal CLKOUT and delay the received output signal CLKOUT by a predetermined amount of delay to output a feedback clock signal FBCLK, and a plurality of replica control circuits 143 and 145 that output a control signal corresponding to each of the delay cells 141_1 and 142_1 as a control signal to control an amount of delay of the delay cells 141_1 and 142_1.

The plurality of replica delay control circuits 143 and 145 may control the time amounts of delays of corresponding delay cells 141_1 and 141_2, respectively. For example, the first replica delay control circuit 145 may control the amount of the delay of the first delay cell 141_2, and the second replica delay control circuit 143 may control the amount of the delay of the second delay cell 141_1.

The replica delay control circuits 143 and 145 according to example embodiments may change the amount of the delays of the delay cells 141_1 and 141_2 in response to the operation mode change signal MODE_INFORM of the device in which the clock signal synchronization circuit 100 is included. For example, one of the replica delay control circuits 143 and 145 may output a control signal that changes an amount of delay of a corresponding delay cell in response to the operation mode change signal MODE_INFORM, and the other one may delay a corresponding delay cell by a fixed amount of delay without changing an amount of the delay of the corresponding delay cell.

In detail, when the second replica delay control circuit 143 receives the change signal MODE_INFORM during the operation, the second replica delay control circuit 143 may delay the output clock signal CLKOUT by providing a control signal that changes the amount of the delay of the second delay cell 141_1, to the second delay cell 141_1. The first replica delay control circuit 145 may delay the output clock signal CLKOUT by providing the same control signal to the first delay cell 141_2 without changing the amount of the delay of the first delay cell 141_2. The changed control signal, output by the second replica delay control circuit 143 based on receiving the operation mode change signal MODE_INFORM, may be a control signal reflecting a clock skew caused by a change in operation mode to turn on delay cells corresponding to a predetermined amount of delay of the second delay cell 141_1. In some embodiments, the changed control signal, output by the second replica delay control circuit 143, may be a control signal designating an input stage in which the output clock signal CLKOUT is input to delay cells connected to each other in cascade, or a signal changing an amount of delay of each delay cell.

Accordingly, unlike a replica circuit that provides a fixed delay of a delay locked loop according to the related art, the replica circuit 140 according to example embodiments may provide a fixed data strobe signal DQS based on a replica signal reflecting a clock skew caused by a change in operation mode of a device without performing re-locking in spite of the change in operation mode. In addition, the replica circuit 140 according to example embodiments may easily and rapidly reflect the clock skew, caused by the change in operation mode, without increasing complexity of the delay line 110. The reflecting the clock skew, caused by the change in operation mode, to determine a predetermined amount of delay will be described below with reference to FIG. 9.

The replica delay control circuits 143 and 145 may be a register circuit that stores a control code including a plurality of bits corresponding to respective cells of the delay cells 141_1 and 141_2, or a charge plump that changes a voltage applied to the respective cells.

In example embodiments, the operation mode change signal MODE_INFORM may be limited to a specific operation mode of a device, and the specific operation mode may be a read mode when the device, in which the clock signal synchronization circuit 100 is included, is a semiconductor memory device.

The replica delay control circuit and the replica delay cells of the replica circuit 140 according to example embodiments will be described in detail with reference to FIGS. 4 to 6.

FIG. 4 is a circuit diagram illustrating an example of the replica delay control circuit of FIG. 3. FIG. 4 illustrates example embodiments in which the replica delay control circuit includes a plurality of register circuits 143a and 145a.

The replica delay control circuit according to example embodiments may include a first register circuit 145a and a second register circuit 143a. The first register circuit 145a may provide a fixed control code FIXED_DELAY_CODE to some delay cells among replica delay cells 141, regardless of a mode of a device. The second register circuit 143a may provide a control code ADAPTIVE_DELAY_CODE, that changes an amount of delay of the delay cells based on the mode of the device, to other delay cells among the replica delay cells 141. The respective delay cells of the replica delay cells 141 may delay the output clock signal CLKOUT in response to a control code, where the output clock signal CLKOUT was provided from a register circuit corresponding to the respective delay cells, to output a feedback clock signal FBCLK.

The first register circuit 145a and/or the second register circuit 143a may be a programmable register, and an input value may be stored in the register according to toggling of a clock signal CK that is input to the register.

Control codes, stored in the first register circuit 145a and the second register circuit 143a, may be different from each other depending on an input clock signal and a clock signal.

The first register circuit 145a may provide the fixed control code FIXED_DELAY_CODE to some corresponding delay cells among the replica delay cells 141 regardless of a change in operation mode of the device. The second register circuit 143a may include a logic element circuit that receives an operation mode signal of the device and an output of a second register, to provide different control codes to other corresponding cells among the replica delay cells 141 according to the change in operation mode of the device.

As an example, when the device is a semiconductor memory device, the second register 143a may change a control mode in a read mode of the semiconductor memory device and may provide the changed control code to some corresponding delay cells among the replica delay cells 141. The logic element circuit may receive the output of the second register and an internal read signal RD_INFORM, which is an internal signal of the semiconductor memory device. In FIG. 4, the logic element circuit of the second register circuit 143a is illustrated as including a NOR gate and a NAND gate, but the configuration of the logic element circuit may vary depending on an initial value of the control code of the second register circuit 143a. The internal read signal RD_INFORM, which is an internal signal of the semiconductor memory device, may be output based on a read command by a command decoder.

The second register circuit 143a may provide the initial value of the control code to some corresponding delay cells, among the replica delay cells 141, when the internal read signal RD_INFORM of the semiconductor memory device has a deactivation level (for example, a logic low level). A changed control code may be provided to some delay cells when the internal read signal RD_INFORM has an active level (for example, a logic high level). The changed control code may be a control code stored in the second register in advance by toggling of a signal ADAPTIVE_CODE_PG, based on a clock signal CK.

When the internal read signal RD_INFORM has an active level, the control code provided to the replica delay cells 141 by the second register circuit 143a may be a control code reflecting a clock skew, caused by a change to the read mode of the semiconductor memory device, to change amounts of delays of the delay cells 141 by a predetermined amount of delay. As an example, when the internal read signal RD_INFORM has an active level, the control code provided by the second register circuit 143a may be a control code reducing a delay of the output clock signal CLKOUT compared with the initial value of the control code.

The first register circuit 145a may output a control code delaying a value obtained by modeling an amount of delay of an output clock signal CLKOUT of an external element based on an input buffer providing an input clock signal REFCLK regardless of the operation mode of the device and the output clock signal CLKOUT.

An output line SEL_j-n of the first register circuit 145a and an output line SEL_1-i of the second register circuit 143a may respectively correspond to different delay cells, included in the replica delay cells 141, to transmit control codes of the first register circuit 145a and a control code of the second register circuit 143a to the replica delay cells 141.

In some embodiments not illustrated in FIG. 4, when the replica delay control circuit includes a single register, the replica delay control circuit may control all delay cells 141 of the replica circuit to control an amount of delay of the output clock signal CLKOUT. In this case, the single register may provide an initial value of a control code to all of the replica delay cells 141, and a control code stored in a register may be provided to a delay cell of a replica circuit by toggling of a clock signal received by the register when the internal read signal RD_INFORM has an active level.

The control code, provided when the internal read signal RD_INFORM has an active level, may be a control code reflecting a clock skew, caused by a change in operation mode of a semiconductor device, to change an amount of delay of the replica delay cells by a predetermined amount of delay.

FIGS. 5 and 6 are circuit diagrams illustrating an example of the replica delay cells 141 of FIG. 3.

Different delay cells 141a and 141b of the replica delay cells 141 according to example embodiments may be exclusively connected to the output line SEL_j-n of the first register circuit 145a and the output line SEL_1-i of the second register circuit 143a.

In example embodiments, the replica delay cells 141a and 141b may include a unit delay cell in which an inverter and a metal oxide semiconductor capacitor (MOSCAP) are connected to each other, but a structure thereof is not limited. As the structure of the replica delay cell, a current-starved delay element, a NAND gate-based delay element, an element adjusting a delay of an inverter with variable resistance, or the like, may be used as long as it may control an amount of delay of each delay cell.

Referring to FIG. 5, the replica delay cells 141a and 141b may include a plurality of inverter stages connected to each other in cascade. The replica unit delay cell 142, an inverter stage, may include a complementary MOS (CMOS) transistor in which a P-channel metal oxide semiconductor (PMOS) transistor and an N-channel MOS (NMOS) transistor are connected to each other in cascade. The replica unit delay cell 142 may include a MOS capacitor MOSCAP between other delay cells, and may delay an output clock signal CLKOUT to be different depending on capacitance of the MOS capacitor, thereby outputting a feedback output signal.

FIG. 6 illustrates some delay cells 142_1 and 142_2, among a plurality of replica delay cells controlled by the second register circuit 143*a*. An example of the delay cells controlled by the second register circuit 143*a* is described in FIG. 6, but the delay cells controlled by the first register circuit 145*a* may also have the same structure.

Referring to FIG. 6, MOS capacitors 610_1, 610_2, 610_3, and 610_4 of the unit delay cells 142_1 and 142_2 may have a shunt capacitor structure. Bits of a control code of the second register circuit 143*a* may be input to transition gates TG1 and TG2 via signal lines SEL_1 and SEL_2. A connection of a gate of a MOS transistor to a delay chain may be controlled by transition gates TG1 and TG2. Accordingly, an effect of capacitance of the shunt capacitor on inverters DL1 and DL2 of the unit delay cells 142_1 and 142_2 may be controlled. As a result, an amount of delay by which the unit delay cells 142_1 and 142_2 delay the output clock signal CLKOUT may be controlled by the transition gates TG1 and TG2 through which the bits of the control code are input to the signal lines SEL_1 and SEL_2.

When the clock signal synchronization circuit 100 according to example embodiments is implemented in a semiconductor memory device, an amount of delay of each of the delay cells 142_1 and 142_2, among the replica delay cells 141, may be changed based on an internal read signal RD_INFORM of the semiconductor memory device.

FIGS. 7 and 8 are timing diagrams illustrating an example of an operation of the clock signal synchronization circuit 100 according to example embodiments. FIGS. 7 and 8 are timing diagrams illustrating example embodiments in which a clock signal synchronization circuit 100 is implemented in a semiconductor memory device, so that a replica circuit changes an amount of delay of an output clock signal CLKOUT in response to the internal read signal RD_IN-FORM.

A command decoder of the semiconductor memory device may decode a read command Read CMD to a falling edge of a corresponding external clock signal CK to generate the internal read signal RD_INFORM corresponding to the read command Read CMD within a significantly short clock time.

The clock signal synchronization circuit 100 may generate an output clock signal CLKOUT to generate a data strobe signal DQS synchronized with an external clock signal CK in response to the internal read signal RD_INFORM. A latency from the falling edge of the external clock signal CK corresponding to the read command Read CMD to an output of the data strobe signal DQS may be determined as read latency. The external clock signal CK is a signal used to generate the input clock signal REFCLK of the clock signal synchronization circuit 100.

The clock signal synchronization circuit 100 according to example embodiments may delay the output clock signal CLKOUT by a changed amount of delay in response to the internal read signal RD_INFORM within a read delay period of the semiconductor memory device to generate a feedback clock signal FBCLK.

Accordingly, before the data strobe signal DQS is generated, an amount of delay corresponding to a clock skew of elements to be increased by a read operation of the semiconductor memory device may be reflected in the output clock signal CLKOUT in advance within a small amount of time. As a result, synchronization between the data strobe signal DQS and the external clock signal CK may be maintained even when the clock skew of the elements is increased by the read operation of the semiconductor memory device.

Meanwhile, in a memory device according to the related art, re-locking of a delay locked loop may be performed by a read operation of the memory device to cause a phase drift of a data strobe signal DQS, as described above with reference to FIG. 2.

An operation of the clock signal synchronization circuit 100 according to example embodiments will be described in detail with reference to the timing diagram of FIG. 8, as example embodiments of the semiconductor memory device. A replica delay control circuit of the clock signal synchronization circuit 100 will be described as example embodiments of the plurality of register circuits 143*a* and 145*a* of FIG. 4.

A command decoder of the memory device may receive a read command Read CMD instructing reading of data stored in a memory cell, and may decode the read command Read CMD at a falling edge of an external clock signal CK to generate an internal read signal RD_INFORM within a significantly short clock time t1 (801). The external clock signal CK may be a clock signal provided to a clock input buffer 200 generating an input clock signal REFCLK.

A second register circuit 143*a* of the replica circuit of the clock signal synchronization circuit 100 may receive the internal read signal RD_INFORM. The second register circuit 143, receiving the internal read signal RD_INFORM, may provide a changed control code Programmed Code to delay cells 141 of the replica circuit, instead of a control code Initial Code which is being transmitted to the control cells 141 of the replica circuit (803). In this case, returning to FIG. 4, the second register circuit 143*a* may transmit the control code Programmed Code to at least some of the delay cells 1410 of the replica circuit based on an activation level of the internal read signal RD_INFORM received by the logic element circuit.

Among delay cells 141_1 corresponding to the second register circuit 143*a* among the delay cells 141 of the replica circuit, unit delay cells corresponding to the changed control code Programmed Code may change an amount of delay of an output clock signal CLKOUT, input to the replica circuit, to output a feedback clock signal FBCLK (804).

The above-described operations, in which the clock signal synchronization circuit 100 receives the internal read signal RD_INFORM and changes an amount of delay of the output clock signal CLKOUT to output a feedback clock, may be performed within a read latency.

The amount of delay of the output clock signal CLKOUT may be changed (804), so that locking of the input clock signal REFCLK and the feedback clock signal FBCLK may be temporarily released (804) and thus a re-locking operation of the clock signal synchronization circuit 100 occurs. However, it is unproblematic because the re-locking operation is performed for a significantly small amount of time (for example, 1 to 2 picoseconds) and is performed before generation of the data strobe signal DQS.

In addition, from a clock time t2 at which the data strobe signal DQS of the memory device is output, an amount of delay of an output clock signal CLKOUT, pre-compensated due to an increase in delay of the output clock signal CLKOUT caused by a clock skew increased due to the start of a read operation, may be canceled (805). Accordingly, the input clock signal REFCLK and the feedback clock signal FBCLK may be synchronized at clock times t3 and t4. As a result, the external clock signal CK and the data strobe signal DQS may be synchronized.

Accordingly, the clock signal synchronization circuit 100 according to example embodiments may reflect a clock skew of various elements that has increased due to the start of the read operation of the memory device, before outputting the data strobe DQS, and thus may maintain synchronization with an external clock of the data strobe signal DQS even when the clock skew of the various elements is increased by the read operation of the memory device. In addition, the clock signal synchronization circuit 100 may prevent re-locking after outputting the data strobe signal DQS, and thus may prevent the data strobe signal DQS from drifting.

FIG. 9 is a diagram illustrating an operation of setting an amount of delay, reflecting a clock skew of elements that has been increased due to a change in operation mode of a semiconductor device according to example embodiments, in advance and illustrates a case, in which a semiconductor device is a memory device, as example embodiments.

The memory device may operate in a standby mode (Stand-by CMD) for a predetermined time (which may be, for example, 100 tCK or more) to lock a clock signal synchronization circuit, and may then change to a specific operation mode. In the example case for reflecting a clock skew caused by an operation change to a read mode of the memory device, a read command Read CMD may be transmitted to the memory device.

When a data strobe signal DQS starts to toggle after reception of the read command Read CMD, a clock skew of an external clock signal CK and the data strobe signal DQS may be monitored for a predetermined time. The monitoring may be performed until the clock skew between the external clock signal CK and the data strobe signal DQS is saturated. The saturated clock skew may be such that additional clock skew is not noticeable or easily detected. In other words, the monitoring is performed until the clock skew between of the external clock signal CK and the data strobe signal DQS is not noticeably changing.

After the reception of the read command Read CMD, skew values Skew_A, Skew_B, and Skew_C of the external clock signal CK and the data strobe signal DQS may be identified at a first rising edge of a data strobe signal DQS of each memory device. Then, a saturated time of the clock skew between external clock signal CK and the data strobe signal of each memory device may be identified. Referring to FIG. 9, a time at which a clock skew of a memory device A is saturated is t3, and a time at which clock skews of memory devices B and C are saturated is t2. While the example embodiment of FIG. 9 has been described under the assumption that a clock skew of each memory device is 0 when the clock skews of all memory devices are saturated, the clock skew may have a value greater than 0 in spite of the saturation.

An amount of delay, reflecting clock skews of elements increased due to a change in operation mode, may be determined at a first rising edge of the data strobe signal DQS of each memory device based on a difference between skew values Skew A, Skew B, and Skew C between the external clock signal CK and the data strobe signal DQS and a time at which a clock skew is saturated. The amount of delay may be determined as a mean, a minimum value, or a maximum value of the difference between the skew values Skew A, Skew B, and Skew C of the external clock signal CK and the data strobe signal DQS and may be determined at the time at which the clock skew is saturated.

The memory device may store a plurality of control codes, setting an amount of delay of a replica delay cell with a different amount of delay, in advance and may set a control code corresponding to a determined amount of delay, among the control codes stored in advance, to be a control code Programmed Code of the replica control circuit. The setting of the control code Programmed Code may be performed during a test of the memory device, or the like. As an example, the plurality of control codes Programmed Code may be stored outside of the memory device, and may be loaded and set in the memory device during the test of the memory device. As another example, a binary code, changing whether among a plurality of replica delay cells, at least some replica delay cells are delayed or an amount of delay of the at least some replica cells (for example, in the case of a delay cell having the same structure as illustrated in FIG. 6), may be set to be a control code Programmed Code. Each bit of a binary code of the control code Programmed Code may refer to a change in whether a corresponding delay cell is delayed or may refer to a change in the amount of delay of the corresponding delay cell.

FIGS. 10 and 11 are block diagrams, each illustrating a portion of a semiconductor memory device 1000 including a clock signal synchronization circuit 100a according to example embodiments. The clock signal synchronization circuit 100a of FIGS. 10 and 11 are similar to the above-described clock signal synchronization circuit 100 of FIG. 3, and thus redundant descriptions thereof will be omitted. The example embodiment of FIGS. 10 and 11 will be described under the assumption that the clock signal synchronization circuit 100a is implemented as a delay locked loop (DLL).

A memory controller of the memory device 1000 may provide an external clock signal CK and a complementary clock signal CKB to a clock input buffer 200. The clock input buffer 200 may temporarily store the external clock signal CK, and may output the stored external clock signal CK as an input clock signal REFCLK. A clock tree 300 may distribute and provide an output clock signal CLKOUT, transmitted from the clock signal synchronization circuit 100a, to a plurality of data output drivers 400. The data output driver 400 may provide data DQ, read from a cell/core 700 of a memory device, to a memory controller together with a data strobe signal DQS.

A command/address decoder 600 may receive commands/ RAS, /CAS, /WE, and/CS input through the memory controller to be stored in a command/address register 500, and may decode the received commands/RAS, /CAS, /WE, and/CS to generate an internal command signal such as an internal read signal RD_INFORM, or the like.

In the case of a memory read operation, the cell/core 700 of the memory device may receive the internal read signal RD_INFORM and a cell address and may transmit data obtained from the cell array to the output driver 400.

The clock signal synchronization circuit 100a may delay an input clock signal, received from the clock input buffer 200, to generate and provide an output clock signal CLKOUT to the clock tree 300.

Referring to FIG. 11, a clock signal synchronization circuit 100a according to example embodiments may include delay cells 141b that receive and delay an output clock signal CLKOUT by a predetermined amount of delay and then output a feedback clock signal FBCLK, and a plurality of replica delay control circuits 143b and 145b output a control signal corresponding to each of the delay cells 141b as a control signal controlling an amount of delay of the delay cells 141b.

Each of the replica delay control circuits 143b and 145b may control an amount of delay of exclusively corresponding delay cells, among the delay cells 141b.

One replica delay control circuit 145b may delay the output clock signal CLKOUT by a fixed amount of delay without receiving the internal read signal RD_INFORM of the memory device. A fixed control signal of the replica delay control circuit may be a signal that delays the output clock signal CLKOUT by an amount of delay obtained by modeling a clock skew td1 of a clock input buffer 200, a clock skew td2 of a clock tree 300, and/or a clock skew of a data output driver 400.

Another replica delay control circuit 143b may transmit a control signal, obtained by changing an initial control signal, to the delay cells 141b to delay the output clock signal CLKOUT when receiving the internal read signal RD_INFORM. The control signal, changed by the replica delay control circuit 143b, may be a control signal reflecting a clock skew of elements to be increased by a read operation of the memory device to delay the output clock signal CLKOUT to be different by a predetermined amount of delay.

In example embodiments, the amount of delay, obtained by modeling the clock skew td1 of the clock input buffer 200, the clock skew td2 of the clock tree 300, and the clock skew td3 of the data output driver 400, may be distributed to and reflected in a fixed control signal of the replica delay control circuit 145b and an initial control signal of the replica delay control circuit 143b.

FIG. 12 is a flowchart illustrating an operation of the clock signal synchronization circuit 100 of FIG. 1.

Referring to FIG. 12, the delay line 110 may delay an input clock signal REFCLK to output an output clock signal CLKOUT in response to a delay control signal in a state in which the clock signal synchronization circuit 100 is locked by synchronizing an input clock signal REFCLK that is input to the clock signal synchronization circuit 100 in a first mode, with a feedback clock signal FBCLK output from a replica circuit (S110).

The clock signal synchronization circuit 100 according to example embodiments may receive a command, instructing an operation mode change to a second mode different from the first mode of the semiconductor device, and an internal command based on the command. The replica control circuit of the clock signal synchronization circuit 100 may change an amount of delay of the output clock signal CLKOUT to output a control signal that controls a replica delay cell to output the feedback clock signal FBCLK. The replica delay cell may receive the changed control signal, and may delay the output clock signal CLKOUT by the changed amount of delay to output the feedback clock signal FBCLK (S120).

The control signal of the replica control circuit and the amount of delay of the replica delay cell in the second mode of the semiconductor device may be different from the control signal and the amount of delay of the replica delay cell in the first mode of the semiconductor device, respectively.

When the replica control circuit is provided in plural, one of the plurality of replica control circuits may provide the same control signal to a replica delay cell regardless of the change in the operation mode of the semiconductor device, and another replica control circuit may provide a control signal, that was changed depending on the operation mode of the semiconductor device, to the replica delay cell. When the semiconductor device is a memory device, the changed control signal may be provided to the replica delay cell in a read mode of the memory device. The changed control signal may be provided to the replica delay cell when an internal read signal, generated by a memory decoder, in response to a read command provided from a memory controller, has an active level.

When the replica control circuit is provided in plural, an amount of delay, obtained by modeling clock skews of elements disposed outside the clock signal synchronization circuit 100, may be reflected in a control signal of the plurality of replica control signals and an amount of delay, obtained by reflecting a clock skew increased by a change in operation mode, may be reflected in a control signal of one of the plurality of replica control signal.

FIG. 13 is a flowchart illustrating an operation method of setting a control signal based on a change in operation mode according to example embodiments.

The memory device may operate in a standby mode (Stand-by CMD) for a predetermined time (which may be, for example, 100 tCK or more) to lock a clock signal synchronization circuit (S210), and may then change to a specific operation mode (S220). In the case for reflecting a clock skew caused by an operation change to a read mode of the memory device, a read command Read CMD may be transmitted to the memory device.

When a data strobe signal DQS starts to toggle after reception of the read command Read CMD, a clock skew between an external clock signal CK and the data strobe signal DQS may be monitored for a predetermined time (S230). The monitoring may be performed until the clock skew between the external clock signal CK and the data strobe signal DQS is saturated.

An amount of delay, reflecting clock skews of elements that have been increased due to a change in an operation mode of the data strobe signal DQS of the plurality of memory devices, may be determined (S240).

The memory device may store a plurality of control codes in advance, which set an amount of delay of a replica delay cell with different amounts of delay, and may set a control code corresponding to a determined amount of delay, among the control codes stored in advance, to be a control code Programmed Code of the replica control circuit.

As set forth above, a clock signal synchronization circuit according to example embodiments may rapidly and accurately compensate for a delay of a clock signal to prevent a locked state of the clock signal synchronization circuit from being released due to a change in power environment and to secure a stable and fast operation of a high-speed circuit such as a memory device, or the like.

While example embodiments have been shown and described above, it will be apparent to those skilled in the art that modifications and variations could be made without departing from the scope of the present inventive concept as defined by the appended claims.

What is claimed is:

1. A clock signal synchronization circuit comprising:
   a delay line configured to delay an input clock signal in response to a delay control signal to output an output clock signal;
   a replica circuit configured to delay the output clock signal to output a feedback clock signal;
   a phase detector configured to compare the input clock signal and the feedback clock signal with each other to detect a phase difference; and
   a delay control circuit configured to generate the delay control signal based on the phase difference,
   wherein the replica circuit comprises a plurality of delay cells and is configured to delay the output clock signal with different predetermined amounts of delay in response to various operation modes of a memory device using the plurality of delay cells to output the feedback clock signal.

2. The clock signal synchronization circuit of claim 1, wherein the replica circuit comprises:
   the plurality of delay cells that are each configured to delay the output clock signal by a predetermined delay, and
   a replica delay control circuit that is configured to output a respective control signal corresponding to respective ones of the delay cells, and is configured to change and output the respective control signal in response to an internal read signal based on a read command of a memory control logic.

3. The clock signal synchronization circuit of claim 1, wherein the replica circuit comprises:
   the plurality of delay cells that are each configured to delay the output clock signal by a predetermined delay, and
   a replica delay control circuit configured to output a respective control signal corresponding to respective ones of the delay cells, and
   wherein ones of the delay cells are configured to delay the output clock signal based on a modeled delay of an input buffer and a modeled delay of an output clock signal of an external element.

4. The clock signal synchronization circuit of claim 1, wherein the replica circuit is configured to delay the output clock signal based on a first control signal and based on a standby command of a memory control logic to output the feedback clock signal, and is configured to delay the output clock signal based on a second control signal, different from the first control signal, and based on a read command of the memory control logic to output the feedback clock signal, and
   wherein the first control signal and the second control signal are control signals in the replica circuit that indicate different amounts of delay.

5. The clock signal synchronization circuit of claim 4, wherein a delay by the second control signal is based on a difference between a first skew of an external clock signal and a data strobe signal,
   wherein the delay is configured to be generated in response to a read command of the memory control logic in a standby mode of the memory device, and based on a second skew after a skew between the external clock signal and the data strobe signal is saturated.

6. The clock signal synchronization circuit of claim 1, wherein the replica circuit comprises a plurality of register circuits,
   wherein ones of the plurality of register circuits are configured to store respective control codes corresponding to respective ones of the plurality of delay cells that are configured to delay the output clock signal, and
   wherein the respective control codes that are stored in the plurality of register circuits are different from each other.

7. The clock signal synchronization circuit of claim 1, wherein the replica circuit comprises the plurality of delay cells that are configured to delay the output clock signal by respective predetermined delays, and a plurality of register circuits that are configured to store respective control codes that control the respective predetermined delays of respective ones of the delay cells, and
   wherein ones of the delay cells are configured to output the feedback clock signal by delaying the output clock signal in response to the respective control codes that are stored in respective ones of the plurality of register circuits.

8. The clock signal synchronization circuit of claim 7, wherein the plurality of register circuits each comprise a first register circuit configured to output a respective one of the control codes that is being fixed, and a second register circuit configured to output the respective ones of the control codes that are different from each other, based on a read command of a memory control logic.

9. The clock signal synchronization circuit of claim 8, wherein the second register circuit is configured to change and output the respective one of the control codes in response to an internal read signal that is output by a command decoder based on the read command.

10. The clock signal synchronization circuit of claim 9, wherein the second register circuit is configured to output a first control code in response to an internal read signal having a deactivation logic level and configured to output a second control code in response to the internal read signal having an activation logic level, and
    wherein a delay of the output clock signal that is responsive to the second control code, is different from a delay of the output clock signal that is responsive the first control code.

11. The clock signal synchronization circuit of claim 10, wherein the second control code is determined based on a change in a skew of an external clock signal and a data strobe signal when the change in the skew is saturated, after the memory device, operating in a standby mode for a predetermined time, operates in a read mode.

12. The clock signal synchronization circuit of claim 9, wherein the second register circuit comprises:
    a plurality of logic gates, respectively corresponding to ones of the plurality of delay cells, and
    a register,
    wherein each of the logic gates is configured to receive the internal read signal and an output of the register, and is configured to output the respective one of the control codes and provide the respective one of the control codes that was output to a respective one of the plurality of delay cells.

13. The clock signal synchronization circuit of claim 7, wherein the delay cells are connected to each other in cascade, and
    wherein each of the delay cells is configured to change a delay of a received signal in response to the respective one of the control codes that was output by a respective one of the plurality of register circuits.

14. The clock signal synchronization circuit of claim 1, wherein the replica circuit is configured to change a delay of the output clock signal based on a read command of a memory control logic in a state in which the input clock signal and the output clock signal are locked.

15. The clock signal synchronization circuit of claim 14, wherein the replica circuit is configured to delay the output clock signal by a changed delay in a read latency period of the memory device to output the feedback clock signal.

16. A semiconductor memory device comprising a plurality of memory cells, the semiconductor memory device comprising:
    an input buffer configured to receive an external clock signal and configured to output a reference clock signal; and a clock signal synchronization circuit configured to delay the reference clock signal based on a delay control signal to generate an output clock signal that is synchronized with the reference clock signal, wherein the clock signal synchronization circuit comprises a replica circuit configured to delay the output clock signal and configured to output a feedback clock signal, and a delay control circuit configured to generate the delay control signal based on a phase difference between the reference clock signal and the feedback clock signal, and wherein the replica circuit comprises a plurality of delay cells and is configured to delay the output clock signal with different predetermined amounts of delay in response to various operation modes of a memory device using the plurality of delay cells to output the feedback clock signal.

17. A method of operating a clock signal synchronization circuit comprising a delay line and a replica circuit, the method comprising:

outputting an output clock signal based on the delay line delaying an input clock signal in response to a delay control signal in a first operation mode of a memory device; and outputting a feedback clock signal by the replica circuit delaying the output clock signal using a plurality of delay cells of the replica circuit to output the feedback clock signal used for generation of the delay control signal, wherein a delay of the output clock signal differs by a different predetermined amount responsive to a change to a second operation mode of the memory device, and wherein the replica circuit comprises the plurality of delay cells.

18. The method of claim 17, wherein the outputting the feedback clock signal further comprises:

changing and providing to delay cells, by a replica delay control circuit in which a control code is stored, at least a portion of the control code that indicates whether delay cells of the replica circuit respectively delay the output clock signal, in response to an internal read signal of a command decoder.

19. The method of claim 18, wherein the replica delay control circuit comprises a first replica delay control circuit configured to output a first delay control signal that is being fixed, and a second replica delay control circuit configured to output a second delay control signal that is different from the first delay control signal being fixed, based on the internal read signal.

20. The method of claim 19, further comprising:

outputting a first control signal in response to the internal read signal having a deactivation logic level and outputting a second control signal in response to the internal read signal having an activation logic level, by the second replica delay control circuit, wherein a delay of the output clock signal that is based on the second control signal is different from a delay of the output clock signal that is based on the first control signal.

* * * * *